(12) United States Patent
McIntosh et al.

(10) Patent No.: US 6,973,509 B2
(45) Date of Patent: Dec. 6, 2005

(54) AUTOMATIC FRAME IDENTIFICATION, DOOR STATUS, AND FRAME COUNT DETECTION SYSTEM

(75) Inventors: Michael Philip McIntosh, Tucson, AZ (US); Charles Anthony Thompson, Jr., Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 09/854,865

(22) Filed: May 14, 2001

(65) Prior Publication Data

US 2002/0169903 A1 Nov. 14, 2002

(51) Int. Cl.⁷ ............................................. G06F 3/00
(52) U.S. Cl. ............................................. 710/15; 710/8
(58) Field of Search .................. 710/300, 1–2, 710/8.9, 301; 709/219, 224; 370/450; 714/44; 711/170; 110/314, 313, 316

(56) References Cited

U.S. PATENT DOCUMENTS

| | | | |
|---|---|---|---|
| 4,932,826 A | | 6/1990 | Moy et al. ............... 414/277 |
| 5,323,327 A | | 6/1994 | Carmichael et al. ...... 364/478 |
| 5,325,255 A | | 6/1994 | Dodt et al. ............... 360/132 |
| 5,416,914 A | | 5/1995 | Korngiebel et al. ...... 395/425 |
| 5,511,871 A | | 4/1996 | Dalziel .................. 312/9.46 |
| 5,901,325 A | * | 5/1999 | Cox ....................... 710/1 |
| 5,966,510 A | * | 10/1999 | Carbonneau et al. ...... 714/44 |
| 6,014,675 A | | 1/2000 | Brewer et al. ........... 707/204 |
| 6,072,804 A | * | 6/2000 | Beyers, Jr. ............. 370/450 |
| 6,347,963 B1 | * | 2/2002 | Falkenberg et al. ...... 439/638 |
| 6,493,785 B1 | * | 12/2002 | Galloway ................ 710/314 |
| 6,633,905 B1 | * | 10/2003 | Anderson et al. ........ 709/219 |
| 2003/0194037 A1 | * | 10/2003 | Ono et al. ............... 375/372 |

FOREIGN PATENT DOCUMENTS

JP     11039755     2/1999     ........... G11B 15/68

OTHER PUBLICATIONS

"Mask Control System", IBM Technical Disclosure Bulletin, vol. 19, No. 4, Sep., 1976, pp. 1228-1229.

* cited by examiner

*Primary Examiner*—Tim Vo
*Assistant Examiner*—Clifford Knoll

(57) ABSTRACT

A system and method to automatically provide frame count, frame identification and status information to each frame within a modular, multi-frame tape library system. In the exemplary embodiment, signals are generated by each frame that have a delay value specific to each frame, which are accumulated and supplied to each frame to determine the total number of frames within the tape library system. A reference pulse is generated by each frame and compared to the delay signal generated by each frame to determine its own identification among the plurality of individual frames. Similarly, a status signal is generated by each frame and supplied to each frame which is indicative, for example, of a door open or other anomaly that can be monitored by all the frames within the tape library system. In the exemplary embodiment, each frame is adapted with a pulse generator and delay signal generator as well as a status register, and each frame is coupled together along a multi-channel bus for carrying the signals generated by each frame.

31 Claims, 5 Drawing Sheets

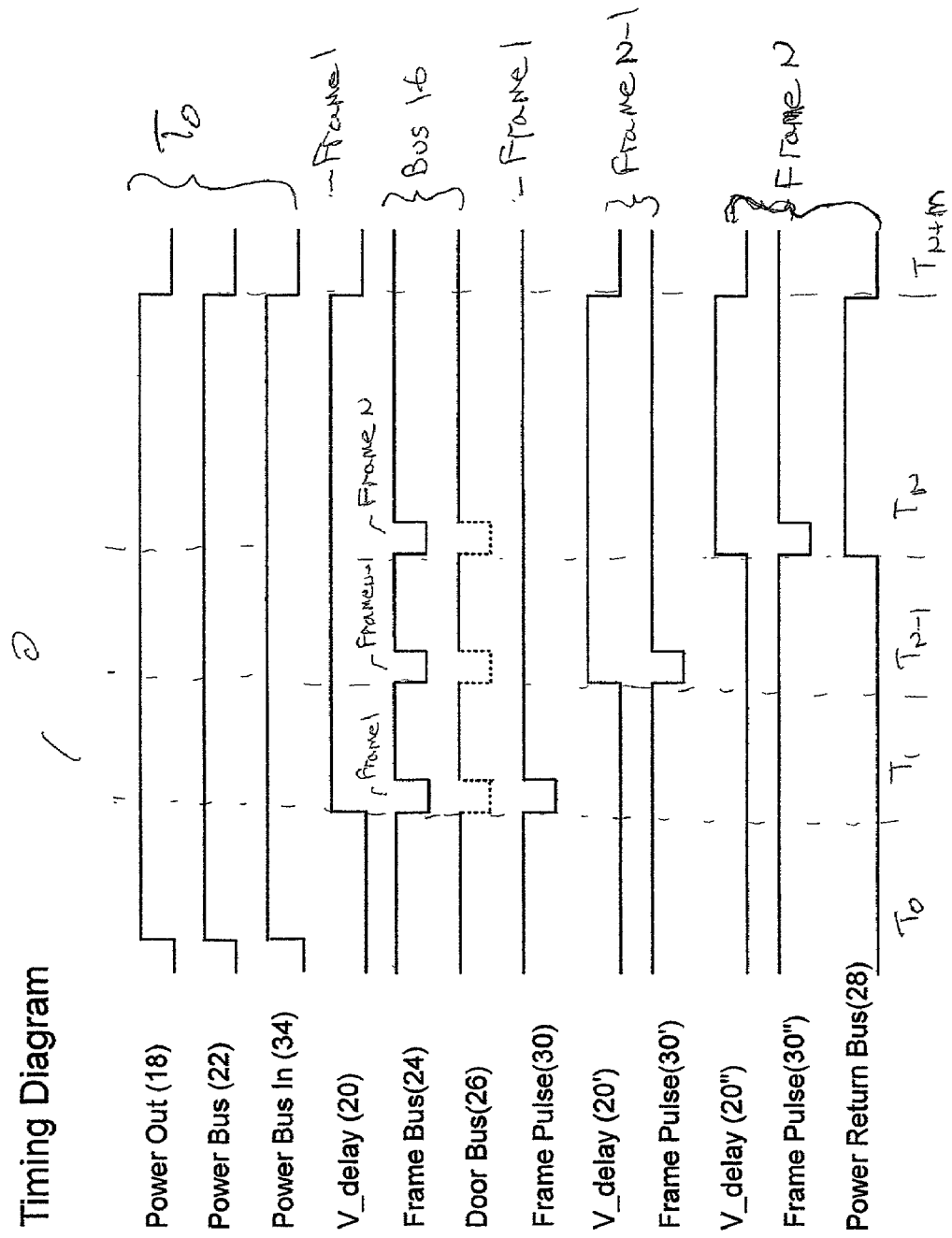

AUTOMATIC FRAME IDENTIFICATION, DOOR STATUS, AND FRAME COUNT DETECTION SYSTEM

BACKGROUND OF THE INVENTION

1. Field of the Invention

The present invention relates to an automatic identification, operational status and count detection system that is part of a modular system of components. In particular, the present invention relates to an automatic frame identification, door status and frame count detection system to enable a modular system such as a tape library system having multiple independent frames to automatically identify each frame in the library and to detect that frame's operational status. The particular utility for the present invention is in modular tape library systems, such as IBM's 3584 tape library system, although the present invention has general applicability to the identification and operational status detection of any modular system.

2. Description of Related Art

Conventional modular multi-frame tape library systems such as the IBM 3494 comprise a plurality of frames connected together to form a tape library. Typically, each frame includes the necessary hardware and software to operate those components of that frame which may include a plurality of tapes, a plurality of tape drive mechanisms for reading and writing data to tapes, and one or more controllable robot members to move tapes to and from tape drive mechanisms. The details of the tapes, tape drives, and robotic members are not important for an understanding of the present invention.

When frames are added together in such systems, it is desirable for methodology in place to identify each frame in the library system. Additionally, it may also be desirable to generate data related to the operational status of each frame within the library. For example, typically frames include outer doors which are opened when that frame is, e.g.; under repair. Such data may be critical since if a frame is inadvertently brought on-line while a repairman is inside, serious injury may result. Conventional techniques of identifying each frame within the library include a manual configuration system where each frame obtains a separate identification using, for example, dip switch settings or address switches which provide a unique identifier to the individual member frames of the tape library. Additionally, in conventional systems when a door of a frame is opened, the entire system needs to be re-inventoried so that an accurate count and operational characteristics of each frame is obtained. When an additional frame member is added to an existing multi-frame library, conventional identification systems require a manual reconfiguration of all the individual frame members to obtain an accurate identification of all the frame members in the library. In such conventional systems, the individual frame members are linked together via a common data bus and the identification and operational status information is stored on a master status register. Thus, in such conventional systems, the individual frame members do not possess the identity and operational characteristics of other frame members within the library.

Thus, there exists a need for a modular tape library system that is adapted to automatically identify and detect the operational status of the individual frame members of the tape library. There also exists a need for the individual frame members of the tape library to track and store data related to itself and the other frame members within the tape library system.

SUMMARY OF THE INVENTION

Accordingly, one exemplary embodiment of the present invention provides a multi-frame tape library system, comprising a plurality of individual frames connected in series, each frame comprising a pulse signal generator and a delay signal generator. At least one of the frames also includes a total count counter. The exemplary embodiment also includes a multi-channel bus coupled to each frame and comprising a power bus for carrying information indicative of power being supplied to a frame, and a power bus return bus carrying information indicative of the last frame in the series. One of the frames is defined as a first frame and adapted to receive a signal indicative of power being supplied to any one of the frames and generate a delayed signal, each subsequent frame receives the delayed signal and generating a further delayed signal and a pulse on the frame bus. One of said frames is defined as the last frame and receives the delayed signal and generates a signal to activate said power return bus. The total count counter is incremented by each pulse on the frame bus until the power return bus is activated.

In this embodiment the total count of the number of frames in the library is identified by the incremental count in the total count counter representing the total number of frames connected together.

In another embodiment, the present invention provides a multi-frame tape library system, comprising a plurality of individual frames connected in series, each frame comprises a pulse signal generator and a delay signal generator. At least one frame also comprises an individual ID counter. This exemplary embodiment also provides a multi-channel bus coupled to each frame and comprising a frame bus for carrying information indicative of the presence of said frame. One of the frames is defined as a first frame and adapted to receive a signal indicative of power being supplied to any one of the frames and generate a delayed signal, each subsequent frame receiving the delayed signal and generating a further delayed signal and each frame generating a pulse on said frame bus. At least one of the frames generates a frame pulse upon generation of that frame's delayed signal. The individual ID counter is incremented by each pulse on the frame bus until the frame pulse is detected.

In this embodiment the individual ID of the frame with the individual ID counter is identified by the incremental count in the individual ID counter with respect to the total number of frames connected together.

In method form, the present invention provides a method to automatically detect the total count of frames within a modular multi-frame tape library system. The method includes the steps of: coupling a plurality of frames to a multi-channel data bus comprising a frame bus and a power bus return bus; designating one of said frames as a first frame; designating one of the frames as a last frame; the first frame receiving a signal indicative of power being supplied to any one of the frames and generating a first delayed signal and a pulse indicative of the presence of the first frame; supplying the pulse to the frame bus; supplying the delayed signal to a subsequent frame, each said subsequent frame generating a delayed signal and a pulse indicative of the presence of each frame and supplying the pulses to the frame bus; generating a signal to activate the power return bus when the delayed signal reaches said last frame; and incrementing a register by each pulse until said power bus is activated.

Still other methods are provided. For example, in yet another exemplary embodiment, the present invention provides a method to automatically detect the individual identification of frames within a modular multi-frame tape library system. The method includes the steps of: coupling a plurality of frames to a multi-channel data bus comprising a frame bus; designating one of the frames as a first frame; the first frame receiving a signal indicative of power being supplied to any one of the frames and generating a first delayed signal and a pulse indicative of the presence of the first frame; supplying said pulse indicative of the presence of the first frame to said frame bus; supplying said delayed signal to a subsequent frame, each subsequent frame generating a delayed signal and a pulse indicative of the presence of each frame and supplying the pulses to the frame bus; generating a signal upon generation of the delayed signal; and incrementing a register by each pulse until said signal is generated.

It will be appreciated by those skilled in the art that although the following detailed description will proceed with reference being made to exemplary embodiments and methods of use, the present invention is not intended to be limited to these exemplary embodiments and methods of use. Rather, the present invention is of broad scope and is intended to be limited only as set forth in the accompanying claims.

Other features of the present invention will become apparent to those skilled in the art as the following detailed description proceeds, and upon reference to the drawings, wherein like numerals depict like parts, and wherein:

BRIEF DESCRIPTION OF THE DRAWINGS

FIG. 2 is an exemplary timing diagram for frame identification, door status and total frame count of the system depicted in FIG. 1.

DETAILED DESCRIPTION OF EXEMPLARY EMBODIMENTS

Figure 1:
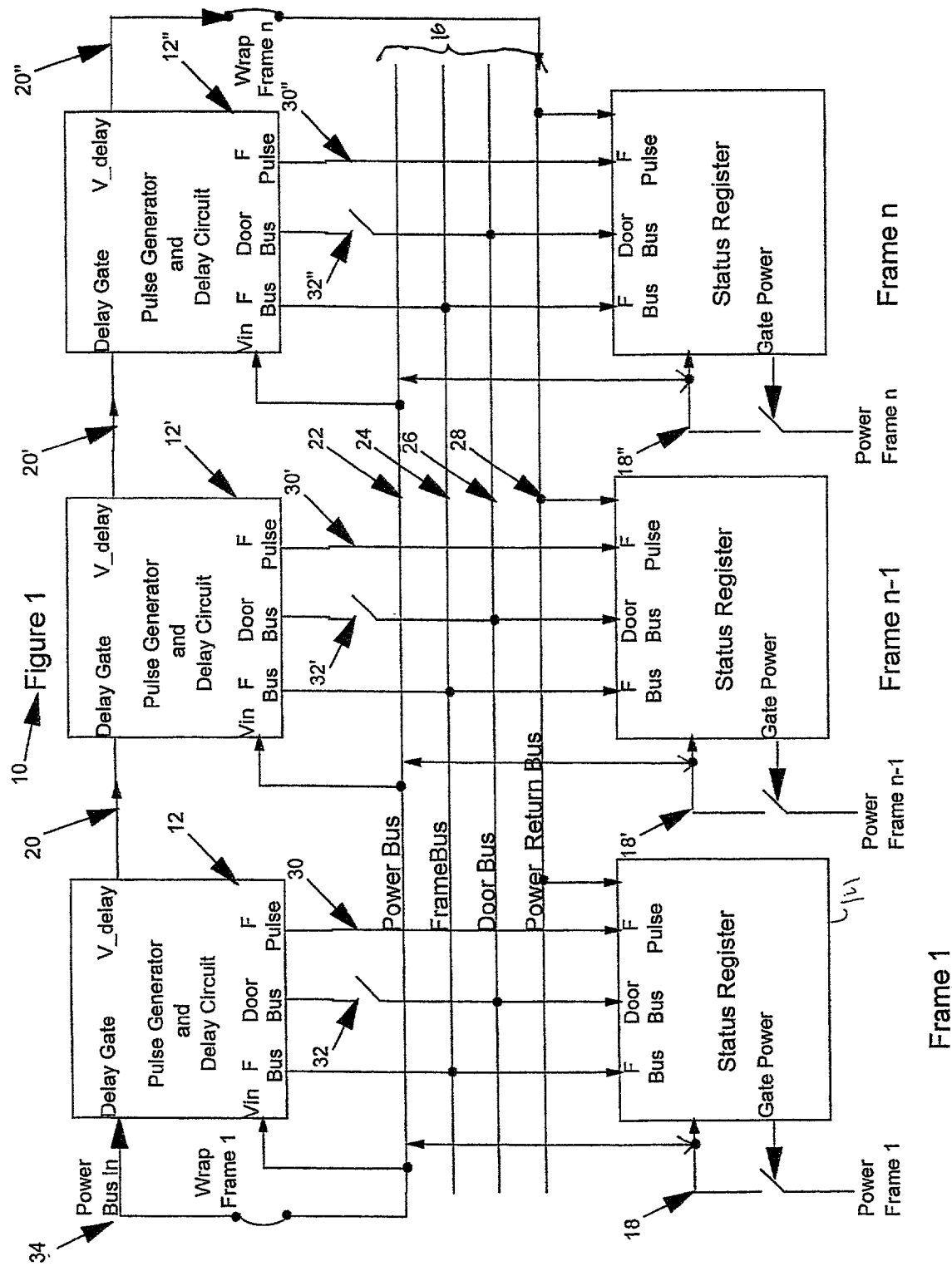
FIG. 1 is an exemplary automatic frame identification and operational status system in a modular multi-frame tape library according to the present invention.

FIG. 1 depicts an exemplary automatic frame identification and operational status system 10 in a modular multi-frame tape library according to the present invention. The exemplary system 10 includes a plurality of frames labeled Frame 1, Frame n-1 and Frame n which constitute a multi-frame tape library system 10. Each frame includes a pulse generator and delay signal generator circuit 12 and a may also include status register 14 (for clarity, only these components for Frame 1 are labeled). The status register may include a plurality of counters and/or registers, and individual registers that could comprise, for example: a total count counter, an individual count counter and/or a status condition counter. Such counters are well-known in the art, and are thus omitted from the drawings for clarity. A multi-channel data bus 16 interconnects each individual frame member with one another. Except as otherwise indicated below, it is to be understood that the frame members are identical and may be interchangeable with one another, and further may be positioned in a different order than depicted in FIG. 1 (e.g., Frame n-1 can trade positional places with Frame n-2), where each frame will be identified in accordance with the following detailed description. The pulse generator and delay signal generator 12 and status register 14 associated with each frame and operable over the multi-channel data bus 16 permit each frame to automatically identify itself and other frame members in the tape library system 10 as well as operational characteristics of each frame member such as door open status and/or other operational characteristics of the frame library.

The first frame (Frame 1) and the last frame (Frame n) are typically identical in all respects with other frames within the library (e.g., Frame n-1), except as follows. In the present invention a delayed power signal is propagated through each member frame by a predetermined time constant. Thus, in the exemplary embodiment shown in FIG. 1 the first frame, and more particularly the pulse generator and delay signal generator 12 of Frame 1, receives a power on input signal 18, 18' or 18" and is responsible for generating the first delayed signal 20 in the series. In each frame, and upon generation of the delayed pulse 20, circuit 12 also generates a frame bus signal and a door bus signal which are supplied to the Frame Bus signal line 24 and Door Bus signal line 26, respectively. Also, when a given delay circuit 12 generates a delay pulse, a frame pulse 30 is also generated and supplied to the status register for that frame. The door status signal may also include a switch 32 that is activated if the door to a particular frame is open. The last frame in the series, frame n, generates a signal to the Power Return Bus 28, which indicates to all the frame members that no more pulses will be generated, and thus a total frame count can be calculated by each frame. The first frame in the series, frame 1, is designated to first receive a power on signal 18 by any of the frames, via connection line 34 between the power bus 22 and the delay gate of the circuit 12, and generate the first delay signal 20 which is then propagated through each frame in the series. Otherwise, the operational characteristics of the functional components 12 and 14 are identical for each frame in the system. These and other characteristics of the present invention are described in greater detail below.

With reference now to the system 10 of FIG. 1, the foregoing characteristics of the pulse generator and upon application of a power, 18, 18' or 18" in any of the frames, power on input signals represent a signal indicative of power being applied to that individual frame, respectively. Initial application of power (18, 18' or 18") by any frame generates a reset signal to each status register (of each frame so-equipped), as shown by the two-way arrow coupling the power bus 22 to each register. In the exemplary embodiment, at least one register comprises a total count counter for tracking the total number of frames in the system, and an individual counter for determining its own ID with respect to the other frames. Referring now to the timing diagram 40 of FIG. 2, application of a power signal 18 supplied to the power bus 22 and supplied 34 to the first circuit 12 of the series is indicated at time $T_0$. Circuit 12, 12' and 12" each have a predetermined time delay for generating the respective delay signal. At time $T_1$, Frame 1 generates the delay signal 20, the frame bus signal 24 and a frame pulse 30. Similarly, frames n-1 and n generate respective delay signals (20' and 20") and frame pulse signals (30' and 30"), as well as frame signals (24' and 24") and, if appropriate, door bus signals (26' and 26") at times $T_{n-1}$ and $T_n$, respectively. Also, the last frame at $T_n$ generates a power bus return signal 28 which stops the count in each frame. At some predetermined later time, $T_{n+m}$, power is removed from each circuit 12, thus permitting another count (described below) upon a future application of a power signal in any frame.

Each frame is identified to itself (with respect to the other frame members) when the individual counter gets incremented by the count of pulses on the frame bus, which stops when the frame generates a frame pulse that is supplied to the counter. For example, if frame n-1 is the second frame, the individual counter in frame n-1 receives the frame bus signal which is incremented twice: once for frame 1 and once for frame n-1. When frame n-1 generates the frame pulse, the individual counter stops incrementing, and thus, frame n-1 is identified as the second frame. The total count counter operates to provide a complete count of the system. The total count counter counts the total number of pulses on the frame bus. Once the power bus return signal is activated, that counter stops incrementing, since there are no more frames in the series. By counting the total number of pulses of the frame bus, and knowing when the count stops, the total count counter tracks the total number of frames in the series. Similarly, a counter in each register tracks the number of pulses on the door bus, and can thus identify the operational characteristics of each frame.

The particular delay time chosen is not important for an understanding of the present invention but is typically chosen in accordance with the engineering tolerances and component speeds of the pulse generator and delay signal generator 12 and the status register 14. Each delay signal 20, 20' and 20" are propagated by each circuit 12, 12' and 12", respectively. Frame n-1 receives the delayed signal 20 and generates another delay signal at time $T_{n-1}$. Likewise, Frame n-1, the frame bus signals 24 and door bus signals 26 are generated at this unique time $T_{n-1}$. Frame n operates similarly but its frame bus signals and door bus signals 24 and 26 are delayed until time $T_n$.

The pulse generator and delay signal generator 12 described herein may comprise custom or conventional pulse and delay signal generation circuitry, which are readily understood by those skilled in the art. For example, the circuit 12 may comprise a conventional pulse generator and RC circuit of a predetermined time constant to generate the pulse signals and the delayed power on input signal described herein. Likewise, the status register 14 for each frame may comprise conventional memory systems and comparators for monitoring the condition on the bus 16 and the power on input signal 18. It is intended that the status register described herein is a general purpose register adapted with one or more counters to achieve the functionality stated herein.

The status register 14 for each frame as shown in FIG. 1 receives data from the multi-channel data bus 16 and stores that information locally. Those skilled in the art will recognize that the multi-channel data bus 16 could be expanded to include the status state of other operational characteristics in addition to the door status depicted. Moreover, each status register may be further adapted with status LEDs to give users a visual indication of each of the status indices obtained by the register, and/or frame ID status, and/or total frame count. Additionally, each status register may be coupled to a master status register (not shown) which monitors the status of all the frames in the tape library system.

Figure 3A:
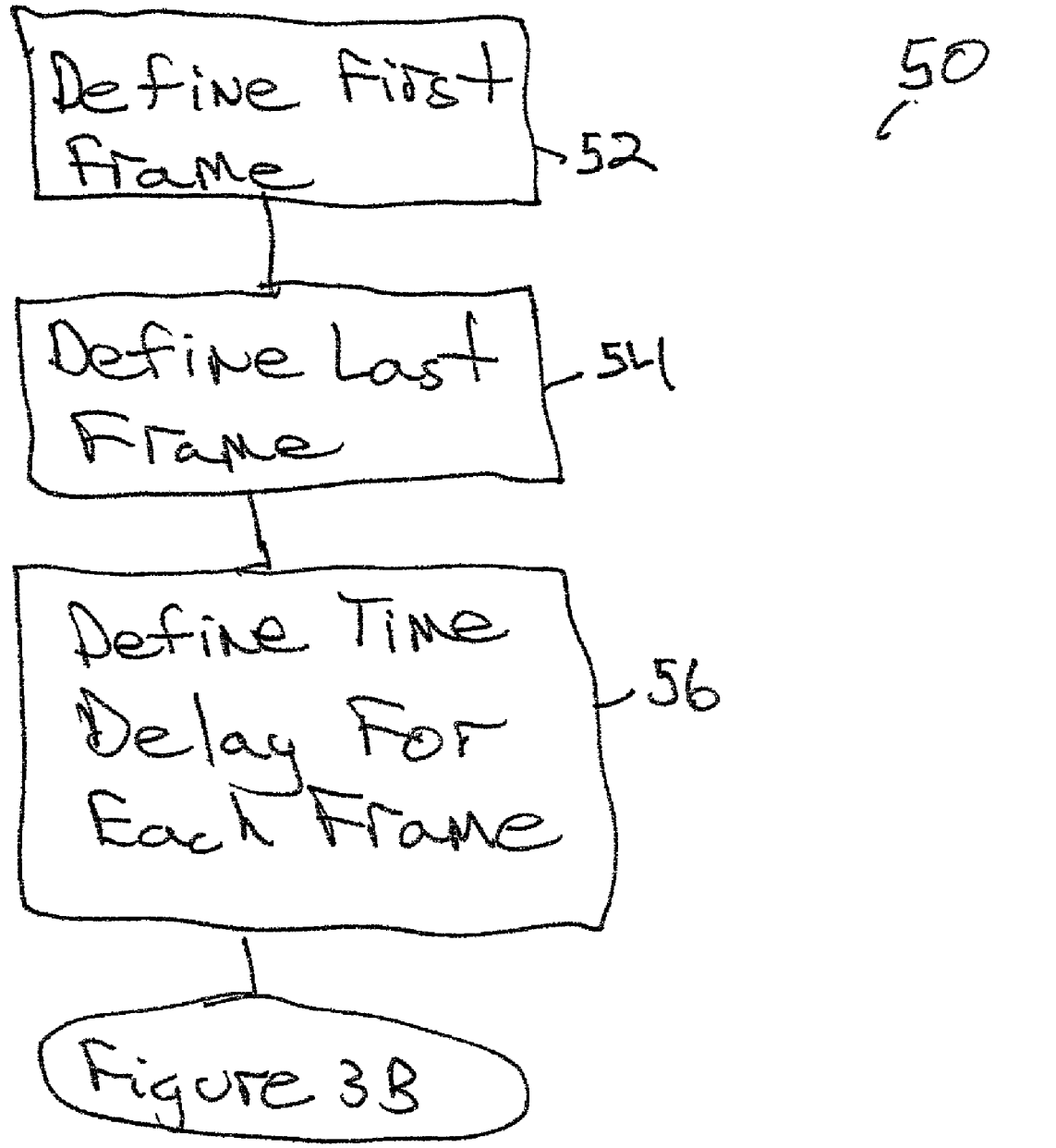
FIGS. 3A–3D depict flowcharts of the exemplary frame detection, identification and status monitoring process according to the present invention.

FIGS. 3A–3D depict flowcharts of the exemplary frame detection, identification and status monitoring process according to the present invention. In FIG. 3A, a setup flowchart 50 is depicted. Initially, a first and last frame members (steps 52 and 54) are defined a priori. In the present exemplary embodiment, the first frame receives a power on signal and generates the first delayed power on signal, and the last frame generates the power bus return signal, thereby ending the count. Also, since the determination of individual frame identification and total frame count relies on a cumulative count of the time delayed power bus signals provided, the delay time for each frame is established to within acceptable tolerances 56. For simplicity, a constant (global) delay time can be established for all the frames. Alternatively, each frame can have a unique delay time.

Figure 3B:
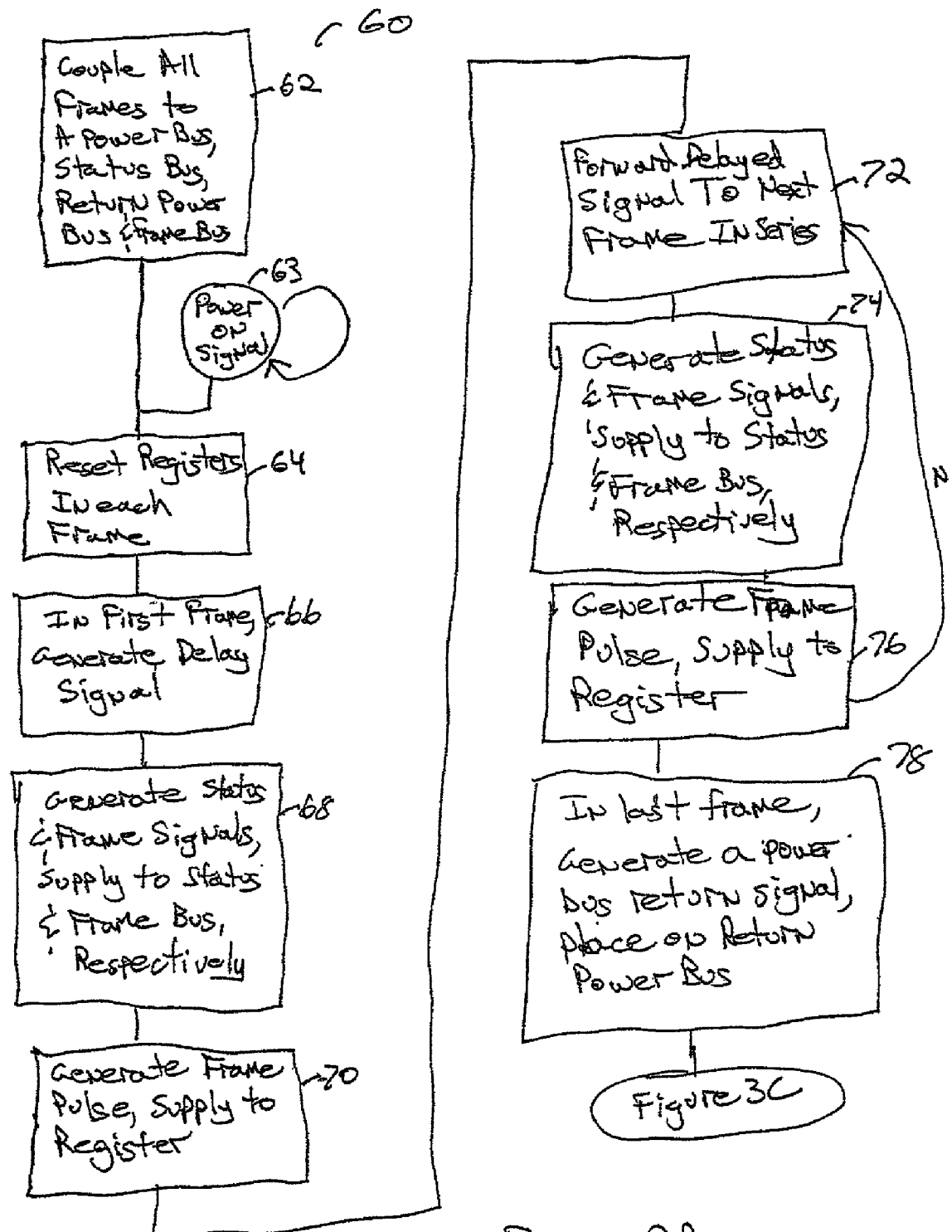

FIG. 3B depicts a flowchart 60 of the signals generated by each frame for identification and status monitoring. All the frames in the library are coupled to a multi-channel bus which may comprise a power bus, a frame bus, a status bus (e.g., door status bus) and a return power bus 62. When any frame is powered on 63, each status register receives this signal and resets the registers 64 (or, more precisely, each counter is zeroed). In the first frame, the signal on the power bus is received, and the first frame generates a delayed signal at a predetermined time (i.e., at time $T_1$ in FIG. 2) 66. The first frame also generates a status signal (e.g., door open status signal) and a frame signal having a delay time equal to the delay of Frame 1, and these signals are placed on the door bus and frame bus, respectively 68. Likewise, a frame pulse is supplied to the register of Frame 1 (70) for counting purposes. The delayed signal generated in the first frame is supplied to the next frame in the series 72, which in turn generates its own delayed signal having a delay time equal to the delay time chosen for that frame. This next frame generates a status signal and a frame signal having a delayed time equal to that frame, and these signals are placed on the door bus and frame bus, respectively 74. Likewise, a frame pulse is generated and supplied to the register of that frame 76. This process is repeated n times, once for each frame in the system. At the last frame, when the delayed signal is generated, a power bus return signal is activated and placed on the power bus return bus, indicating an end to the count 78.

Figure 3C:
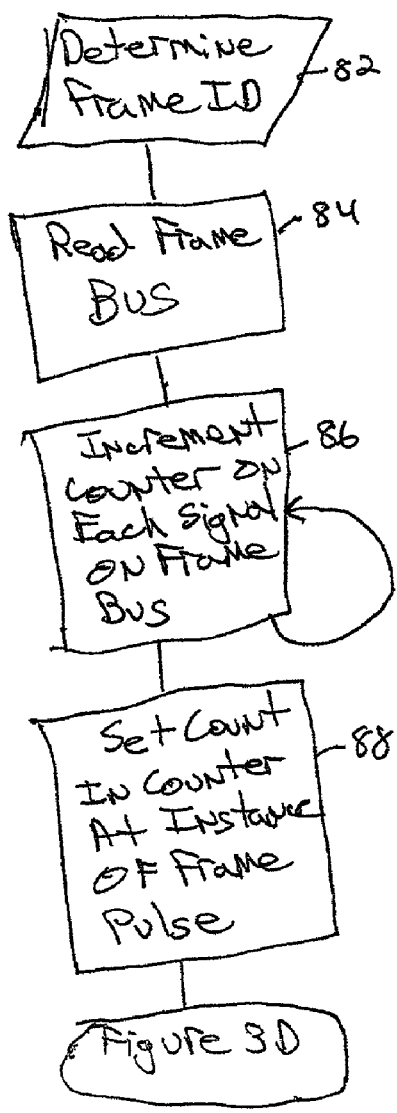
Figure 3D:
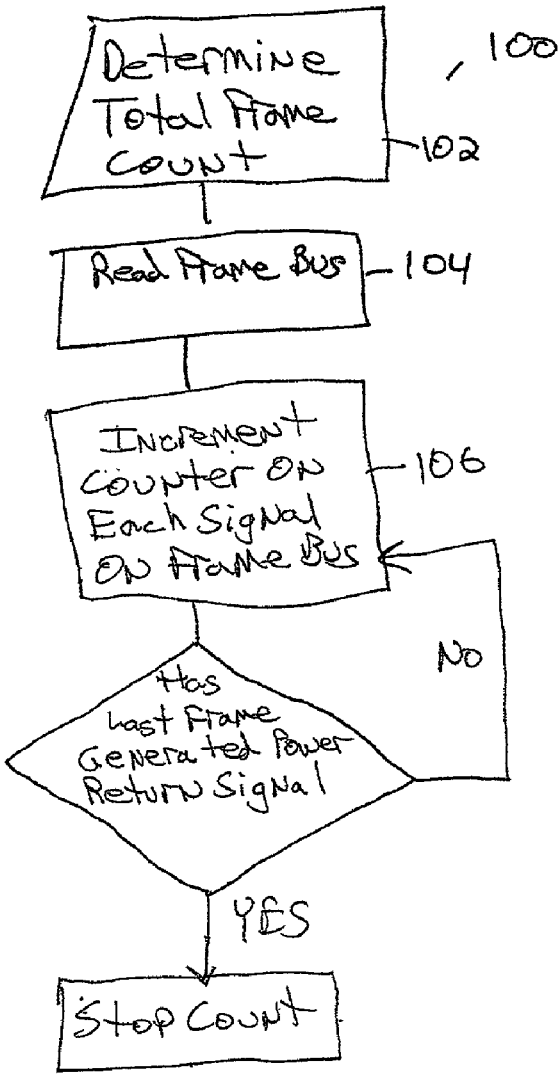

FIGS. 3C and 3D represent flowcharts 80 and 100 for determining the individual frame ID, and the total count of frames in the library system, respectively. To determine the ID of an individual frame 82, a frame reads the pulses on the frame bus to increment the individual count counter in the status register 84. Each time a pulse is generated on the frame bus, the individual counter is incremented 86. This process continues until the frame generates a frame pulse. Once a frame pulse is generated and supplied to the individual counter, the register sets the count in the individual counter 88, thus generating each frame's ID with respect to the other frames. To determine the total frame count 102 (FIG. 3D), a frame reads the pulses on the frame bus to increment a total count counter in the status register 104, and each time a pulse is generated on the frame bus, the total count counter is incremented 86. The register determines if the last frame has generated a power return signal (by monitoring the power return bus) 108. If not, the total count counter continues incrementing 106. If a power return signal is present, the total count counter freezes the count 110, and the total number of frames is determined by the data in the counter. Although not expressly shown, each frame can similarly monitor the status (e.g., door open status) of the other frames since this data is likewise available on the common bus.

Those skilled in the art will recognize numerous modifications may be made to the present invention, without departing from the spirit and scope of this invention. For example, the description above of FIG. 2 assumed that the time frames $T_0$–$T_n$ are equal. However, the present invention can be adapted where the individual time frames are not equal to one another. Moreover, the signals depicted in FIG. 2 need not be square wave signals of definite duration, but may rather be simple pulses, or other signals sufficient to trigger the counter events as detailed above, as will be readily understood to those skilled in the art. Moreover, the circuitry depicted in FIG. 1 could be equally adapted, in whole or in part, to generate signals with the opposite polarity than depicted in FIG. 2. It will also be understood that although the drawings depict a plurality of frames connected together adapted with the circuitry shown, other configurations are contemplated. For example, each frame need not necessarily be adapted with a register, but rather may be a frame adapted for another purpose that is added onto the bus as another node. Other modifications can be made. The individual ID counter described herein could be replaced with a general-purpose register, where the frame pulse signal 30 is used to transfer the current contents of the frame counter register into the individual frame ID register. Thus, as used herein, counters and registers may be used interchangeably. These and other modifications will become readily apparent to those skilled in the art and all such modifications are deemed within the spirit and scope of the present invention, only as limited by the appended claims.

What is claimed is:

1. A multi-frame tape library system, comprising:
    a plurality of individual library frames connected in series, each said frame comprising a pulse signal generator, a plurality of tapes, a plurality of tape drive mechanisms for reading and writing data to said tapes, one or more controllable robot members to move said tapes to and from said tape drive mechanisms and a delay signal generator, at least one said frame also comprising a total count counter;
    a multi-channel bus coupled to each said frame and comprising a frame bus for carrying information indicative of the presence of each said frame, and a power bus return bus carrying information indicative of the last frame in said series;
    wherein one of said frames being defined as a first frame and adapted to receive a signal indicative of power being supplied to any one of said frames and generate a delayed signal, each subsequent frame receiving said delayed signal and generating a further delayed signal and each frame generating a pulse on said frame bus;
    wherein one of said frames being defined as said last frame and receiving said delayed signal and generating a signal to activate said power return bus; and wherein said total count counter being incremented by each said pulse on said frame bus until said power return bus is activated.

2. A multi-frame tape library system as claimed in claim 1, wherein the count in said total count counter represents the total number of said frames connected together.

3. A multi-frame tape library system as claimed in claim 1, wherein at least one said frame generates a frame pulse when said delay signal is generated for that frame.

4. A multi-frame tape library system as claimed in claim 3, wherein at least one said frame further comprising an individual ID counter being incremented by each said pulse on said frame bus until said frame pulse is generated.

5. A multi-frame tape library system as claimed in claim 4, wherein the count in said individual ID counter represents the individual ID of the frame with respect to the total number of said frames connected together.

6. A multi-frame tape library system as claimed in claim 1, wherein said delayed signal generated by each said frame having a predetermined delay value that is approximately constant.

7. A multi-frame tape library system as claimed in claim 1, wherein said delayed signal generated by each said frame having a delay value that is variable.

8. A method to automatically detect the total count of frames within a modular multi-frame tape library system, said method comprising the steps of:
    coupling a plurality of frames to a multi-channel data bus comprising a frame bus and a power bus return bus, each of said plurality of frames comprising a plurality of tapes, a plurality of tape drive mechanisms for reading and writing data to said tapes and one or more controllable robot members to move said tapes to and from said tape drive mechanisms;
    designating one of said frames as a first frame;
    designating one of said frames as a last frame;
    said first frame receiving a signal indicative of power being supplied to any one of said frames and generating a first delayed signal and a pulse indicative of the presence of said first frame;
    supplying said pulse to said frame bus;
    supplying said delayed signal to a subsequent frame, each said subsequent frame generating a delayed signal and a pulse indicative of the presence of each frame and supplying the pulses to said frame bus;
    generating a signal to activate said power return bus when said delayed signal reaches said last frame; and
    incrementing a register by each pulse until said power bus is activated.

9. A method as claimed in claim 8, further comprising the steps of:
    generating a frame pulse when said delay signal is generated for that frame;
    incrementing a register by each said pulse on said frame bus until said frame pulse is generated.

10. A method as claimed in claim 9, wherein the count in said counter represents the individual ID of the frame with respect to the total number of said frames connected together.

11. A method as claimed in claim 8, wherein the count in said register represents the total number of said frames connected together.

12. A multi-frame tape library system, comprising:
    a plurality of individual library frames connected in series, each said frame comprising a pulse signal generator, a delay signal generator, a plurality of tapes, a plurality of tape drive mechanisms for reading and writing data to said tapes, one or more controllable robot members to move said tapes to and from said tape drive mechanisms and at least one said frame also comprising an individual ID counter;
    a multi-channel bus coupled to each said frame and comprising a frame bus for carrying information indicative of the presence of each said frame;
    wherein one of said frames being defined as a first frame and adapted to receive a signal indicative of power being supplied to any one of said frames and generate a delayed signal, each subsequent frame receiving said delayed signal and generating a further delayed signal and each frame generating a pulse on said frame bus;
    wherein at least one of said frames generating a frame pulse upon generation of that frame's delayed signal, and wherein said individual ID counter being incremented by each said pulse on said frame bus until said frame pulse is detected.

13. A multi-frame tape library system as claimed in claim 12, wherein the count in said individual ID counter represents the individual ID of the frame with respect to the total number of said frames connected together.

14. A multi-frame tape library system as claimed in claim 12, wherein said multi-channel bus further comprising a power bus return bus carrying information indicative of the last frame in said series; and wherein one of said frames being defined as said last frame and receiving said delayed signal and generating a signal to activate said power return bus.

15. A multi-frame tape library system as claimed in claim 14, wherein at least one said frame further comprising a total count counter; and wherein said total count counter being incremented by each said pulse on said frame bus until said power return bus is activated.

16. A multi-frame tape library system as claimed in claim 15, wherein the count in said total count counter represents the total number of said frames connected together.

17. A modular tape library system comprising:
   a plurality of individual library frames connected together in series, each of said plurality of frames comprising a plurality of tapes, a plurality of tape drive mechanisms for reading and writing data to said tapes, one or more controllable robot members to move said tapes to and from said tape drive mechanisms and at least one frame comprising an individual ID counter;
   a multi-channel bus for exchanging information and data between said frames indicative of the presence of each said frame;
   wherein at least of said frames being adapted to receive a signal indicative of power being supplied to any one of said frames and generate a pulse indicative of its presence and a delayed signal which is forwarded to the next frame in the series, each subsequent frame receiving said delayed signal and generating a further delayed signal and a pulse indicative of their presence; wherein at least one of said frames generating a frame pulse upon generation of that frame's delayed signal, and wherein said individual ID counter being incremented by each said pulse on said frame bus until said frame pulse is detected.

18. A modular system as claimed in claim 17, wherein the count in said individual ID counter represents the individual ID of the frame with respect to the total number of said frames connected together.

19. A modular system as claimed in claim 17, wherein said multi-channel bus further comprising a power bus return bus carrying information indicative of the last frame in said series; and wherein one of said frames being defined as said last frame and receiving said delayed signal and generating a signal to activate said power return bus.

20. A modular system as claimed in claim 19, wherein at least one said frame further comprising a total count counter, and wherein said total count counter being incremented by each said pulse on said frame bus until said power return bus is activated.

21. A modular system as claimed in claim 20, wherein the count in said total count counter represents the total number of said frames connected together.

22. A method to automatically detect the individual identification of frames within a modular multi-frame tape library system, said method comprising the steps of:
   coupling a plurality of library frames to a multi-channel data bus comprising a frame bus, each of said plurality of frames comprising a plurality of tapes, a plurality of tape drive mechanisms for reading and writing data to said tapes and one or more controllable robot members to move said tapes to and from said tape drive mechanisms;
   designating one of said frames as a first frame;
   said first frame receiving a signal indicative of power being supplied to any one of said frames and generating a first delayed signal and a pulse indicative of the presence of said first frame;
   supplying said pulse indicative of the presence of said first frame to said frame bus;
   supplying said delayed signal to a subsequent frame, each said subsequent frame generating a delayed signal and a pulse indicative of the presence of each frame and supplying the pulses to said frame bus;
   generating a signal upon generation of said delayed signal; and
   incrementing a register by each pulse until said signal is generated.

23. A method as claimed in claim 22, further comprising the steps of:
   coupling said plurality of framed to said multi-channel bus further comprising a power bus return bus;
   designating one of said frames as a last frame;
   generating a signal to activate said power return bus when said delayed signal reaches said last frame; and
   incrementing a register by each said pulse until activation of said power return bus.

24. A method as claimed in claim 22, wherein the count in said counter represents the individual ID of the frame with respect to the total number of said frames connected together.

25. A method as claimed in claim 23, wherein the count in said counter represents the total number of said frames connected together.

26. A multi-frame tape library system, comprising:
   a plurality of individual library frames connected in series, each said frame comprising a pulse signal generator, and a delay signal generator, a plurality of tape drive mechanisms for reading and writing data to said tapes, one or more controllable robot members to move said tapes to and from said tape drive mechanisms and at least one said frame also comprising a total count counter and an individual ID counter;
   a multi-channel bus coupled to each said frame and comprising a frame bus for carrying information indicative of the presence of each said frame, and a power bus return bus carrying information indicative of the last frame in said series;
   wherein one of said frames being defined as a first frame and adapted to receive a signal indicative of power being supplied to any one of said frames and generate a delayed signal, each subsequent frame receiving said delayed signal and generating a further delayed signal and each frame generating a pulse on said frame bus; wherein one of said frames being defined as said last frame and receiving said delayed signal and generating a signal to activate said power return bus; and wherein said total count counter being incremented by each said pulse on said frame bus until said power return bus is activated; and wherein at least one said frame generating a frame pulse when said delay signal is generated for that frame, said individual ID counter being incremented by each said pulse on said frame bus until said frame pulse is generated.

27. A multi-frame tape library system as claimed in claim 26, wherein the count in said individual ID counter represents the individual ID of the frame with respect to the total number of said frames connected together.

28. A multi-frame tape library system as claimed in claim 26, wherein the count in said total count counter represents the total number of said frames connected together.

29. A method to automatically detect the total count and individual identification of frames within a modular multi-frame tape library system, said method comprising the steps of:

coupling a plurality of library frames to a multi-channel data bus comprising a frame bus and a power bus return bus, each of said plurality of frames comprising a plurality of tapes, a plurality of tape drive mechanisms for reading and writing data to said tapes and one or more controllable robot members to move said tapes to and from said tape drive mechanisms;

designating one of said frames as a first frame;

designating one of said frames as a last frame;

said first frame receiving a signal indicative of power being supplied to any one of said frames and generating a first delayed signal and a pulse indicative of the presence of said first frame;

supplying said pulse to said frame bus;

supplying said delayed signal to a subsequent frame, each said subsequent frame generating a delayed signal and a pulse indicative of the presence of each frame and supplying the pulses to said frame bus;

generating a signal to activate said power return bus when said delayed signal reaches said last frame;

incrementing a first counter by each pulse until said power bus is activated;

generating a frame pulse when said delay signal is generated for that frame;

incrementing a second counter by each said pulse on said frame bus until said frame pulse is generated.

30. A method as claimed in claim 29, wherein the count in said second counter represents the individual ID of the frame with respect to the total number of said frames connected together.

31. A method as claimed in claim 29, wherein the count in said first counter represents the total number of said frames connected together.

\* \* \* \* \*